(12) United States Patent
Tian et al.

(10) Patent No.: US 12,450,115 B2
(45) Date of Patent: Oct. 21, 2025

(54) BOOTLOADER FAILURE ANALYSIS OF MEMORY SYSTEM

(71) Applicant: Micron Technology, Inc., Boise, ID (US)

(72) Inventors: Jianping Tian, Shanghai (CN); Da Hong, SanYang (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/742,798

(22) Filed: Jun. 13, 2024

(65) Prior Publication Data

US 2024/0427657 A1    Dec. 26, 2024

Related U.S. Application Data

(60) Provisional application No. 63/522,295, filed on Jun. 21, 2023.

(51) Int. Cl.
*G06F 11/07* (2006.01)
*G06F 9/4401* (2018.01)

(52) U.S. Cl.
CPC ........ *G06F 11/0787* (2013.01); *G06F 9/4408* (2013.01); *G06F 11/073* (2013.01)

(58) Field of Classification Search
CPC ... G06F 11/0787; G06F 9/4408; G06F 11/073
See application file for complete search history.

(56) References Cited

U.S. PATENT DOCUMENTS

| | | | |
|---|---|---|---|
| 11,275,638 B1* | 3/2022 | Huang | G06F 11/0751 |
| 2006/0161822 A1* | 7/2006 | Furuta | G06F 11/0706 |
| | | | 714/52 |
| 2012/0054541 A1* | 3/2012 | Byom | G06F 11/0793 |
| | | | 714/E11.085 |
| 2019/0386977 A1* | 12/2019 | Shah | H04W 60/00 |
| 2022/0318022 A1* | 10/2022 | Li | H04L 9/3247 |
| 2023/0060908 A1* | 3/2023 | Wang | G06F 9/4408 |
| 2024/0003972 A1* | 1/2024 | Nguyen | G01R 31/318555 |
| 2024/0037240 A1* | 2/2024 | Sasidharan | G06F 21/575 |

* cited by examiner

*Primary Examiner* — Matthew M Kim
*Assistant Examiner* — Matthew N Putaraksa
(74) *Attorney, Agent, or Firm* — Schwegman Lundberg & Woessner, P.A.

(57) ABSTRACT

Various embodiments described herein provide for bootloader failure analysis of a memory system using information regarding a failure of the bootloader, where the information is stored on the memory sub-system in response to detection of (e.g., stored at the time of) the failure. In particular, the stored information can comprise data that would be lost or otherwise inaccessible for subsequent diagnostic (e.g., debug) purposes, such as by a manufacturer of the memory sub-system. According to some embodiments, a memory sub-system is configured to save information regarding a failure of a bootloader, to one or more designated memory devices of the memory sub-system, such that diagnostic firmware (e.g., debug firmware) subsequently loaded and executed on the memory sub-system (e.g., by a manufacturer) can make use of the stored information to perform one or more diagnostic functions (e.g., debug functions) on the memory sub-system.

20 Claims, 6 Drawing Sheets

BOOTLOADER FAILURE ANALYSIS OF MEMORY SYSTEM

PRIORITY APPLICATION

This application claims the benefit of priority to U.S. Provisional Application Ser. No. 63/522,295, filed Jun. 21, 2023, which is incorporated herein by reference in its entirety.

TECHNICAL FIELD

Embodiments of the disclosure relate generally to memory devices and, more specifically, to bootloader failure analysis of a memory system.

BACKGROUND

A memory sub-system can include one or more memory devices that store data. The memory devices can be, for example, non-volatile memory devices and volatile memory devices. In general, a host system can use a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to facilitating analysis of bootloader failure on a memory system, such as a memory sub-system as described herein. A memory sub-system is also hereinafter referred to as a "memory device". An example of a memory sub-system is a storage system, such as a solid-state drive (SSD). In some embodiments, the memory sub-system is a hybrid memory/storage sub-system. In general, a host system can use a memory sub-system that includes one or more memory components. The host system can provide data to be stored at the memory sub-system and can request data to be retrieved from the memory sub-system. Though various embodiments are described herein with respect to memory sub-systems, techniques described herein can be applied to other memory systems as well.

A memory sub-system can be a storage device, a memory module, or a hybrid of a storage device and memory module. Examples of storage devices and memory modules are described below in conjunction with FIG. 1. In general, a host system can use a memory sub-system that includes one or more components, such as memory devices that store data. The host system can send access requests to the memory sub-system, such as to store data at the memory sub-system and to read data from the memory sub-system.

The host system can send access requests (e.g., write command, read command) to the memory sub-system, such as to store data on a memory device at the memory sub-system, read data from the memory device on the memory sub-system, or write/read constructs (e.g., such as submission and completion queues) with respect to a memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., error-correcting code (ECC) codeword, parity code), data version (e.g., used to distinguish age of data written), valid bitmap (which LBAs or logical transfer units contain valid data), and so forth.

The memory sub-system can initiate media management operations, such as a write operation, on host data that is stored on a memory device. For example, firmware of the memory sub-system may re-write previously written host data from a location of a memory device to a new location as part of garbage collection management operations. The data that is re-written, for example as initiated by the firmware, is hereinafter referred to as "garbage collection data."

"User data" hereinafter generally refers to host data and garbage collection data. "System data" hereinafter refers to data that is created and/or maintained by the memory sub-system for performing operations in response to host requests and for media management. Examples of system data include, and are not limited to, system tables (e.g., logical-to-physical memory address mapping table, also referred to herein as a L2P table), data from logging, scratch pad data, and so forth.

A memory device can be a non-volatile memory device. A non-volatile memory device is a package of one or more die. Each die can be comprised of one or more planes. For some types of non-volatile memory devices (e.g., negative-and (NAND)-type devices), each plane is comprised of a set of physical blocks. For some memory devices, blocks are the smallest area than can be erased. Each block is comprised of a set of pages. Each page is comprised of a set of memory cells, which store bits of data. The memory devices can be raw memory devices (e.g., NAND), which are managed externally, for example, by an external controller. The memory devices can be managed memory devices (e.g., managed NAND), which are a raw memory device combined with a local embedded controller for memory management within the same memory device package.

Traditionally, when a memory sub-system is set for a boot mode that enables normal operation and usage of the memory sub-system (e.g., a normal or a user boot mode for storage of and access to user data on the memory sub-system), the memory sub-system loads and executes a bootloader. For example, when a memory sub-system, such as an SSD, is powered in a normal boot mode (e.g., a user boot mode), a process of the bootloader initiates in the memory sub-system to enable loading and execution of an operating system within the memory sub-system. As used herein, a bootloader (e.g., bootloader software or firmware program) of a memory sub-system can be configured to cause operational software or firmware of the memory sub-system (e.g., the memory sub-system's operating system (OS) software) to be loaded into operational memory (e.g., main memory, such as random-access memory (RAM)) of the memory sub-system (e.g., from a read-only memory (ROM) device of the memory sub-system), and cause the execution of the loaded operational software/firmware. Usually, during execution of the bootloader, a memory controller of the memory sub-system can read a set of instructions (e.g., code) stored on a ROM device of the memory sub-system. Typically, the operational software/firmware of the memory sub-system is configured to facilitate the normal operation and usage of the memory sub-system. Accordingly, by causing the loading and execution of operational software/firmware of a memory sub-system, a bootloader of the memory sub-system can boot or boot-up operation of the memory sub-system. The bootloader can comprise a primary bootloader (PBL), which can run a self-test and search for a boot memory device (e.g., a non-volatile memory component of the memory sub-system) that stores a secondary bootloader (SBL), which can read and load programs (e.g., operational software/firmware) from a storage media into operational memory of the memory sub-system and can pass control to the programs for operation of the memory sub-system.

During execution, a bootloader of a memory sub-system can fail at various steps or operations, such as initialization of physical memory components (e.g., negative-and (NAND)-type memory devices), loading of operational firmware/software (e.g., main firmware) to operational memory of the memory sub-system, verification of the operational firmware/software prior to execution of the operational firmware/software, or execution of the operational firmware/software. Such failures can result, for example, from a physical memory component issues (e.g., issue with an application-specific-integrated-circuit (ASIC), a NAND-type memory device, or operational memory of the memory sub-system), or from corruption of the stored copy/image of operational firmware/software, which can be detected during verification of the operational firmware/software.

At present, when a bootloader of a memory sub-system fails during execution of one of its steps or operations, a failure is raised or asserted on the memory sub-system. Bootloaders of memory sub-systems usually do not have an error recovery handler and, as such, when a failure is raised/asserted, some memory sub-systems enter a panic mode, which is a dead loop of code. The failure, panic mode, or both may also cause some memory sub-systems to emit a signal, such a blinking light (e.g., via a physical component such as a light-emitted diode (LED)), to indicate the failure/panic mode. As a result, debugging bootloader failures on memory sub-systems can be difficult and take a lot of time and resources (e.g., human resources) to debug, such as during field qualification processes of memory sub-systems or running in field. This is especially true in cases where a signal that indicates issue/failures can be reset (such as for a system reboot test for field qualification of memory sub-system), where it is hard for a user to observe the signal in time to know the issue/failure source.

For instance, current methods for debugging a memory sub-system bootloader issue/failure can include: generating or updating debug firmware that includes one or more debug messages and that is configured to reproduce the issue/failure; causing the generated/updated debug firmware to be loaded and executed on a memory sub-system that is to be debugged (e.g., causing the memory sub-system to boot up using the generated/updated debug firmware), capturing data logs while the generated/updated debug firmware causes the issue/failure to be reproduced on the memory sub-system, and then analyzing the captured data log to debug the issue/failure. At the moment, such methods of debugging do not have access to or the benefit of information (e.g., failure messages generated) or data (e.g., binary data dump of processing device or operational memory) of the memory sub-system at the time the issue/failure actually occurred, making it challenging to generate/update the debug firmware. For instance, without information or data from the memory system from the time of the actual issue/failure, a human engineer would have to iteratively generate/update debug firmware until the data log captured (during reproduction of the issue/failure) meets desired analysis requirements (e.g., captured data log has sufficient information to successfully debug the issue/failure). Reproducing issue/failure can be particularly challenging for a user or vendor in situations where reproduction involves a lot of resources, such as during temperature cycle testing that use specific chamber equipment.

Various embodiments described herein provide for bootloader failure analysis of a memory system using information regarding a failure of the bootloader (e.g., bootloader firmware), where the information is stored on the memory sub-system in response to detection of (e.g., stored at the time of) the failure. In particular, the stored information can comprise data that would be lost or otherwise inaccessible for subsequent diagnostic (e.g., debug) purposes, such as by a manufacturer of the memory sub-system. According to some embodiments, a memory sub-system is configured to save information regarding a failure of a bootloader, to one or more designated memory devices of the memory sub-system, such that diagnostic firmware (e.g., debug firmware) subsequently loaded and executed on the memory sub-system (e.g., by a manufacturer) can make use of the stored information to perform one or more diagnostic functions (e.g., debug functions) on the memory sub-system.

Depending on the embodiment, the stored information can comprise a failure reason (e.g., panic reason) or a failure message (e.g., panic or debug message). The failure reason can, for instance, describe a failure type (e.g., panic type), such as failure to initialize a memory component (e.g., failure to initialize NAND-type memory device), failure to load firmware (e.g., operational firmware), or failure to verify firmware (e.g., operational firmware). The failure message can comprise an identifier (e.g., a pointer generated from code building process) to a string message in a set of possible string messages (e.g., 100 possible messages), where the identifier can also be used to identify where in the firmware code the failure (e.g., panic) occurred. The following Table 1 provides examples of failure reasons and failure messages for some embodiments.

TABLE 1

| FAILURE REASON | FAILURE MESSAGE | FAILURE REASON IDENTIFIER |
|---|---|---|
| NAND problem | NAND Flash initialization failed. | STATUS_NAND_ASSERT |
| | Load firmware image failed. | 0xA0000000 |
| Invalid | No valid firmware image found. | STATUS_INVALID_IMAGE |

TABLE 1-continued

| FAILURE REASON | FAILURE MESSAGE | FAILURE REASON IDENTIFIER |
|---|---|---|
| firmware image | FW image verification failed. | 0xB0000000 |
| Controller problem | Security processor is busy. Unexpected exception occurred. Unexpected interrupt occurred. | STATUS_BL_ASSERT 0xC0000000 |

The stored information can also comprise a data dump (e.g., panic dump binary) of the memory sub-system at the time the failure was detected, where the data dump can include context data stored on a processing device of the memory sub-system at the time of failure, global variables of the memory sub-system at the time of the failure, one or more events logs of the memory sub-system at the time of the failure, cache data of the memory sub-system at the time of the failure, registers of the memory sub-system at the time of the failure, and the like. For some embodiments, some portions of the information (e.g., that do not use as much data storage, such as failure reasons or failure messages) are stored on a first type of memory device of the memory sub-system (e.g., type of memory device that does not rely on the bootloader firmware for initialization or provides limited data storage, such as an electrically erasable programmable read-only memory (EEPROM) device of the memory sub-system), while other portions of the information (e.g., that use larger amounts of data storage) are stored on a second type of memory device (e.g., type of memory device that relies on the bootloader firmware for initialization or provides larger amount of data storage, such as a NAND-type memory device).

Eventually, after information regarding a failure of a bootloader has been stored on a memory sub-system, a ROM can be first checked and a last error code can be printed via a hardware data communications interface (e.g., serial port). Thereafter, the diagnostic firmware (e.g., debug firmware) can be loaded and executed on the memory sub-system, where the diagnostic firmware can enable access to the stored information and the diagnostic firmware, and can use at least some portion of the stored information to perform diagnostics (e.g., debugging) on the memory sub-system.

Various embodiments described herein can be useful where a user (e.g., customer) attempts to boot up a memory sub-system, the bootloader of the memory sub-system loads, executes and fails, and the user desires for a support or a diagnostic team (e.g., the manufacturer) to diagnose or debug the failure. For instance, the user can power down the memory sub-system and physically return the memory sub-system to its manufacturer. In turn, the manufacturer can cause the memory sub-system to boot up in a diagnostic boot mode (e.g., serial data connection boot mode), can cause the memory sub-system to load and execute diagnostic firmware, and can use the executing diagnostic firmware to use or otherwise access stored information regarding the failure to diagnose or debug the failure. The user of the stored information can permit a support or a diagnostic team (e.g., of the manufacturer) to perform enhanced analysis of a failure of bootloader firmware on a memory sub-system. In some instances, various embodiments described herein can permit a support or a diagnostic team to access stored information (e.g., debug information) even when a memory sub-system (e.g., SSD) is unable to be booted up using bootloader firmware. The information regarding a bootloader failure stored on a memory sub-system can enable a support or a diagnostic team to reproduce an issue or a failure in order to diagnose, debug, or otherwise solve the issue/failure. Accordingly, use of some embodiments save time, resources (e.g., equipment and human resources), or both in reproducing an issue or a failure of a memory sub-system. This can be particularly useful in debugging a memory sub-system during product development, and can accelerate product launch of the memory sub-system.

As used herein, a bootloader boot mode can refer to a boot mode of a memory system that causes the memory system to load and execute bootloader firmware on the memory system. A bootloader boot mode can be regarded as a non-diagnostic boot mode. As used herein, a non-bootloader boot mode can refer to a boot mode of a memory system that causes the memory system to avoid loading and executing bootloader firmware on the memory system. For instance, a non-bootloader boot mode can be configured to cause a memory system to load and execute non-bootloader firmware on the memory system instead of bootloader firmware. An example of non-bootloader firmware can include diagnostic firmware, such as debug firmware.

Figure 1:
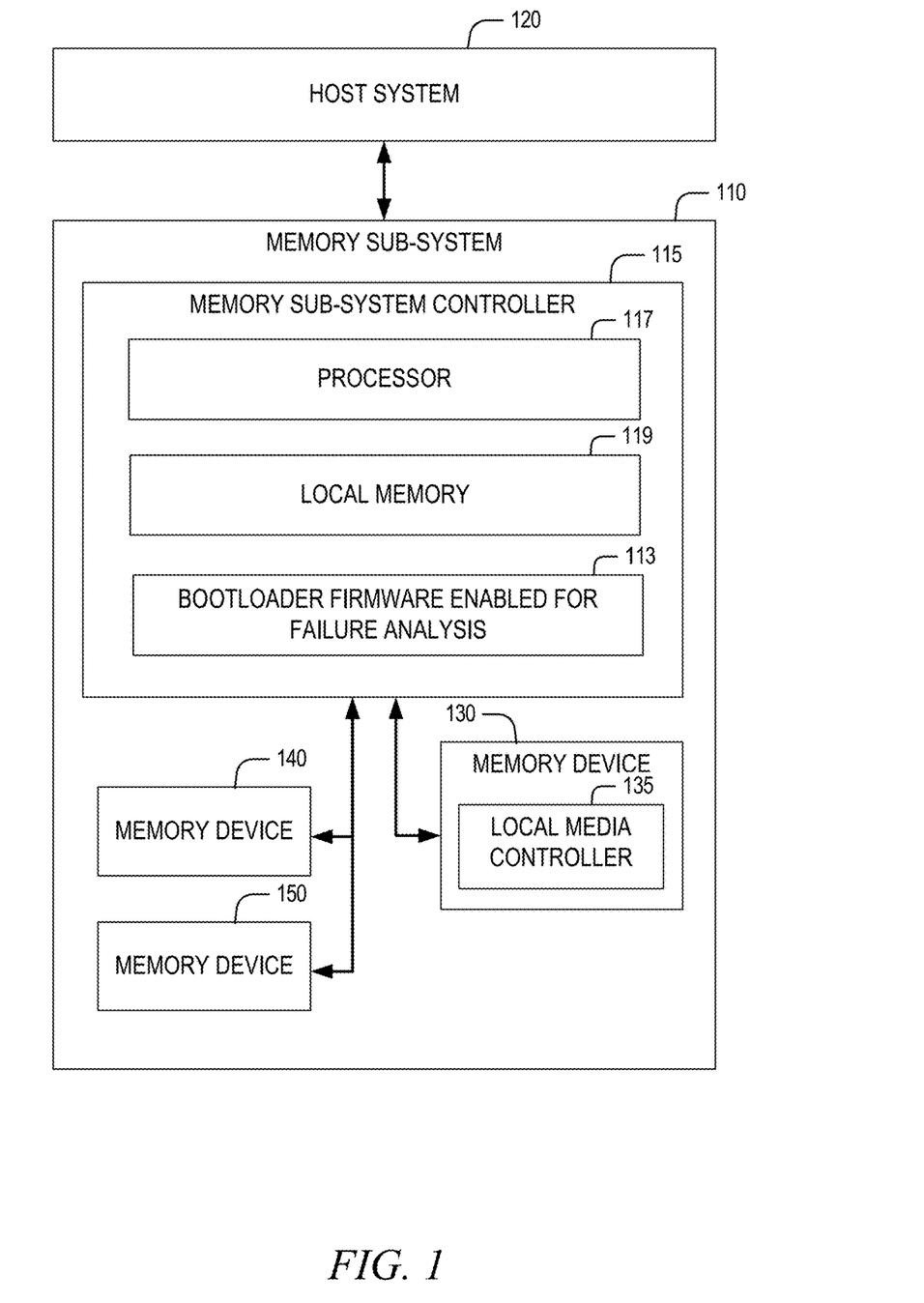
FIG. 1 is a block diagram illustrating an example computing system that includes a memory sub-system, in accordance with some embodiments of the present disclosure.

FIG. 1 illustrates an example computing system 100 that includes a memory sub-system 110, in accordance with some embodiments of the present disclosure. The memory sub-system 110 can include media, such as one or more volatile memory devices, one or more non-volatile memory devices, or a combination of such. Memory devices 130, 140, 150 can represent the media of the memory sub-system 110.

A memory sub-system 110 can be a storage device, a memory module, or a hybrid of a storage device and memory module. Examples of a storage device include a solid-state drive (SSD), a flash drive, a universal serial bus (USB) flash drive, a secure digital (SD) card, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and various types of non-volatile dual in-line memory module (NVDIMM). Examples of a storage extend card include, without limitation, a compute express link (CXL) storage card, or a CXL memory card.

The computing system 100 can be a computing device such as a desktop computer, laptop computer, a server (e.g., network, compute, storage), a mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., NVDIMM controller), and a storage protocol controller (e.g., a peripheral component interconnect express (PCIe) controller, serial advanced technology attachment (SATA) controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a SATA interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), CXL interface, or any other interface. The physical host interface can be used to transmit data between the host system 120 and the memory sub-system 110. The host system 120 can further use an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140, 150 can include any combination of the different types of non-volatile memory devices and/or volatile memory devices. The volatile memory devices can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

One or more of the memory devices 130, 140, 150 can each include one or more arrays of memory cells. One type of memory cell, for example, SLCs, can store one bit per cell. Other types of memory cells, such as multi-level cells (MLCs), TLCs, quad-level cells (QLCs), and penta-level cells (PLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as NAND type flash memory (e.g., 2D NAND, 3D NAND) and 3D cross-point array of non-volatile memory cells are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, and so forth. The local memory 119 can also include read-only memory (ROM) for storing micro-code, such as bootloader firmware configured to initialize the memory sub-system 110 for use when the memory sub-system 110 boots-up (e.g., initially powers up). While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130, the memory device 140, the memory device 150, or some combination thereof. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical memory address (e.g., physical block address) that are associated with the memory devices 130. The memory sub-system controller 115 can further include host interface circuitry to communicate with the host system 120 via the physical host interface. The host interface circuitry can convert the commands received from the host system 120 into command instructions to access at least one of the memory devices 130, 140, 150 as well as convert responses associated with at least one of the memory devices 130, 140, 150 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 135) for media management within the same memory device package. An example of a managed memory device is a managed NAND (MNAND) device.

The memory sub-system controller 115 includes a bootloader firmware enabled for failure analysis 113 (hereafter, bootloader firmware 113) that enables or facilitates bootloader failure analysis on the memory sub-system 110 in accordance with various embodiments described herein. For some embodiments, the memory sub-system 110 is set to a bootloader boot mode (e.g., normal or user boot mode), which causes the processor 117 (e.g., processing device) to load the bootloader firmware 113, from a first memory device (e.g., memory device 140) of a first memory type (e.g., ROM), to a second memory device (e.g., the local memory 119) of a second memory type (e.g., RAM) for execution by the processor 117. After the bootloader firmware 113 is loaded to the second memory device, the processor 117 causes the bootloader firmware 113 to be executed from the second memory device by the processor 117 in accordance with various embodiments.

For some embodiments, the bootloader firmware 113 is configured to cause the processor 117 to store information regarding a failure of the bootloader firmware 113 to be saved on a third memory device (e.g., memory device 150) of a third memory type (e.g., EEPROM) in response to detection of the failure. According to some embodiments, the third memory device (e.g., memory device 150) is one that does not need initialization on the memory sub-system 110 prior to writing or reading data with respect to the third memory device.

For various embodiments, execution of the bootloader firmware 113 causes the processor 117 to: initialize a fourth memory device (e.g., memory device 130) of a fourth memory type (e.g., NAND-type memory devices); cause operational firmware to be loaded, from the fourth memory device (e.g., memory device 130), to the second memory device (e.g., the local memory 119) for execution by the processor 117; and cause the operational firmware (as loaded on the fourth memory device) to be executed from the second memory device (e.g., the local memory 119) by the processor 117. For some embodiments, the fourth memory device can be at least one memory device (e.g., one of the NAND-type memory devices) of the memory sub-system 110 used by the memory sub-system 110 to store user data on the memory sub-system 110. Execution of the bootloader firmware 113 can cause the processor 117 to verify the bootloader firmware 113 (e.g., validate that the bootloader firmware 113 is not corrupted or tampered with) prior to the operational firmware being executed by the processor 117, and the processor 117 executing the operational firmware in response to the operational firmware being successfully verified.

Depending on the embodiment, failure of the bootloader firmware 113 during execution can comprise loading of the operational firmware to the local memory 119, verification of the operational firmware prior to execution of the operational firmware by the processor 117, or execution of the operational firmware by the processor 117. Other steps/operations of the bootloader firmware 113 can result in a failure to be raised during execution of the bootloader firmware 113, and can result in information regarding a failure of the bootloader firmware 113 to be saved on the third memory device (e.g., memory device 150). For some embodiments, the information stored on the third memory device comprises information describing a type of failure (e.g., a failure type, which can represent a failure reason), information regarding a failure message, or both. Examples of types of failures can include, without limitation, a failure to initialize a memory component (e.g., failure to initialize NAND-type memory device), a failure to load firmware (e.g., operational firmware), or a failure to verify firmware (e.g., operational firmware). A type of failure can comprise a failure type identifier. A failure message can comprise a string message for the failure. For some embodiments, the failure message comprises an identifier (e.g., a pointer) to a string message in a set of possible string messages (e.g., 100 possible messages), where the identifier can also be used to identify where in the code of the bootloader firmware 113 the failure occurred.

According to some embodiments, the bootloader firmware 113 is configured to cause the processor 117 to store a data dump associated with the processor 117 to be saved on the fourth memory device (e.g., the memory device 130) in response to detection of the failure. For some embodiments, the data dump comprises contextual data stored within the processing device at a time of the failure of the bootloader firmware 113. Additionally, the data dump can comprise one or more of: global variables of the memory sub-system 110 at the time of the failure, one or more events logs of the memory sub-system 110 at the time of the failure, cache data of the memory sub-system 110 at the time of the failure, registers of the memory sub-system 110 at the time of the failure. For various embodiments, the fourth memory device (e.g., the memory device 130) is one that has to be initialized by the bootloader firmware 113 prior to the processor 117 writing or reading data with respect to the fourth memory device. For instance, initializing the fourth memory device can comprise initializing file system access on the fourth memory device.

After information regarding a failure of the bootloader firmware 113 is stored to the third memory device (e.g., the memory device 150), the data dump at the time of the failure is stored to the fourth memory device (e.g., the memory device 130), or both, the memory sub-system 110 can be set to a non-bootloader boot mode, which can cause the processor 117 to avoid loading and executing the bootloader firmware 113. For some embodiments, the memory sub-system 110 is set to a non-bootloader boot mode that causes the processor 117 to load a diagnostic firmware (e.g., debug firmware) to the second memory device (e.g., the local memory 119), and causes the diagnostic firmware to be executed from the second memory device by the processor 117, where execution of the diagnostic firmware causes the processor 117 to access at least a portion of the information from the third memory device (e.g., the memory device 150), at least a portion of the data dump from the fourth memory device (e.g., the memory device 130), or both. For some embodiments, the diagnostic firmware is configured to reproduce (or assist in reproducing) a failure of the bootloader firmware 113 based on one or both of the at least a portion of the information accessed from the third memory device (e.g., the memory device 130) and the at least a portion of the information accessed from the third memory device (e.g., the memory device 150). For some embodiments, the diagnostic firmware is configured to enable a diagnostic software application (e.g., debug tool software application) operating on the host system 120 to access (e.g., use) one or both of the at least portion of the information accessed from the third memory device (e.g., the memory device 130) and the at least a portion of the information accessed from the third memory device (e.g., the memory device 150). For some embodiments, the diagnostic firmware is configured to provide an interactive interface for executing a diagnostic function on the memory sub-system 110, where the diagnostic function can be configured to access one or both of the at least a portion of the information accessed from the third memory device (e.g., the memory device 130) and the at least a portion of the information accessed from the third memory device (e.g., the memory device 150). According to some embodiments, the interactive interface is configured to execute the diagnostic function in response to a command received by the interactive interface from the host system 120 operatively coupled to the memory sub-system 110. For instance, the command can be generated or transmitted from a debugging software application operating on the host system 120. Example commands can include, without limitation, read firmware image (e.g., to cause the memory sub-system 110 to read a specified firmware image from a non-volatile memory device to the local memory 119), get memory sub-system information (e.g., serial number, model number, customer identifier, status, and the like), and non-volatile memory device initialization (e.g., attempt to initialize a non-volatile memory device again and see if any problems are reported).

Depending on the embodiment, the diagnostic firmware can be loaded to the second memory device (e.g., the local memory 119) from one of the memory devices 130, 140, 150 or from a hardware data communications interface, such as a hardware serial data interface. For instance, the current boot mode of the memory sub-system 110 can be set (or changed) to a serial data connection boot mode that causes the diagnostic firmware to be loaded to the second memory device (e.g., from a data storage device external to the memory sub-system 110) via a hardware serial data interface (e.g., to which the data storage device can operably couple). For some embodiments, the serial data connection boot mode causes the diagnostic firmware to be loaded to the second memory device via the hardware serial data interface after power for the memory sub-system 110 is cycled. The hardware serial data interface of an embodiment can be based on a universal asynchronous receiver/transmitter (UART) protocol, and the serial data communication boot mode can comprise a UART boot mode. Additionally, for some embodiments, the serial data communication boot mode is set for the memory sub-system 110 by way of one or more hardware pins of the memory sub-system 110, such a General-Purpose Input/Output (GPIO) pin.

Figure 2:
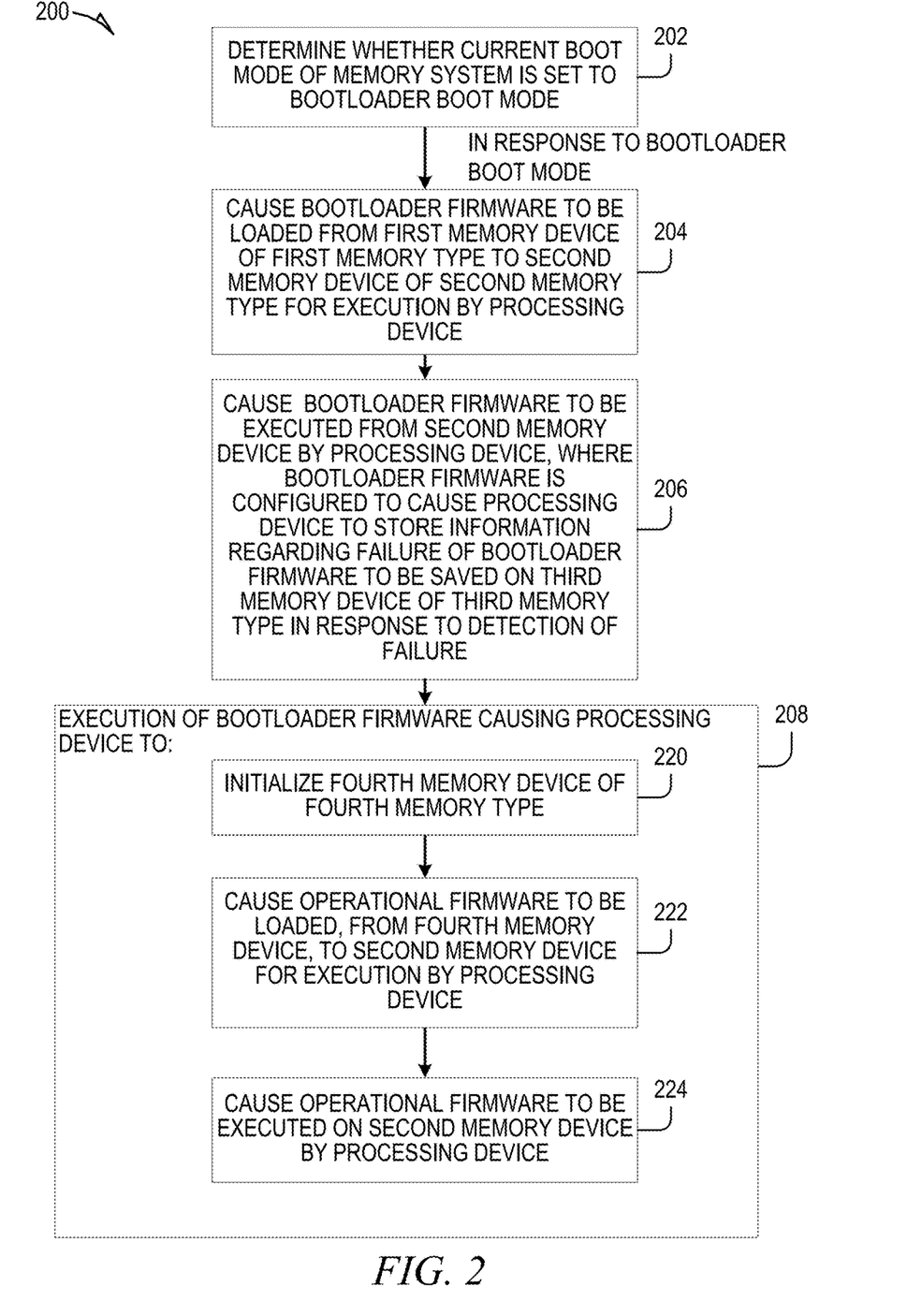
FIGS. 2 and 3 are flow diagrams of example methods for bootloader failure analysis of a memory system, in accordance with some embodiments of the present disclosure.
Figure 3:
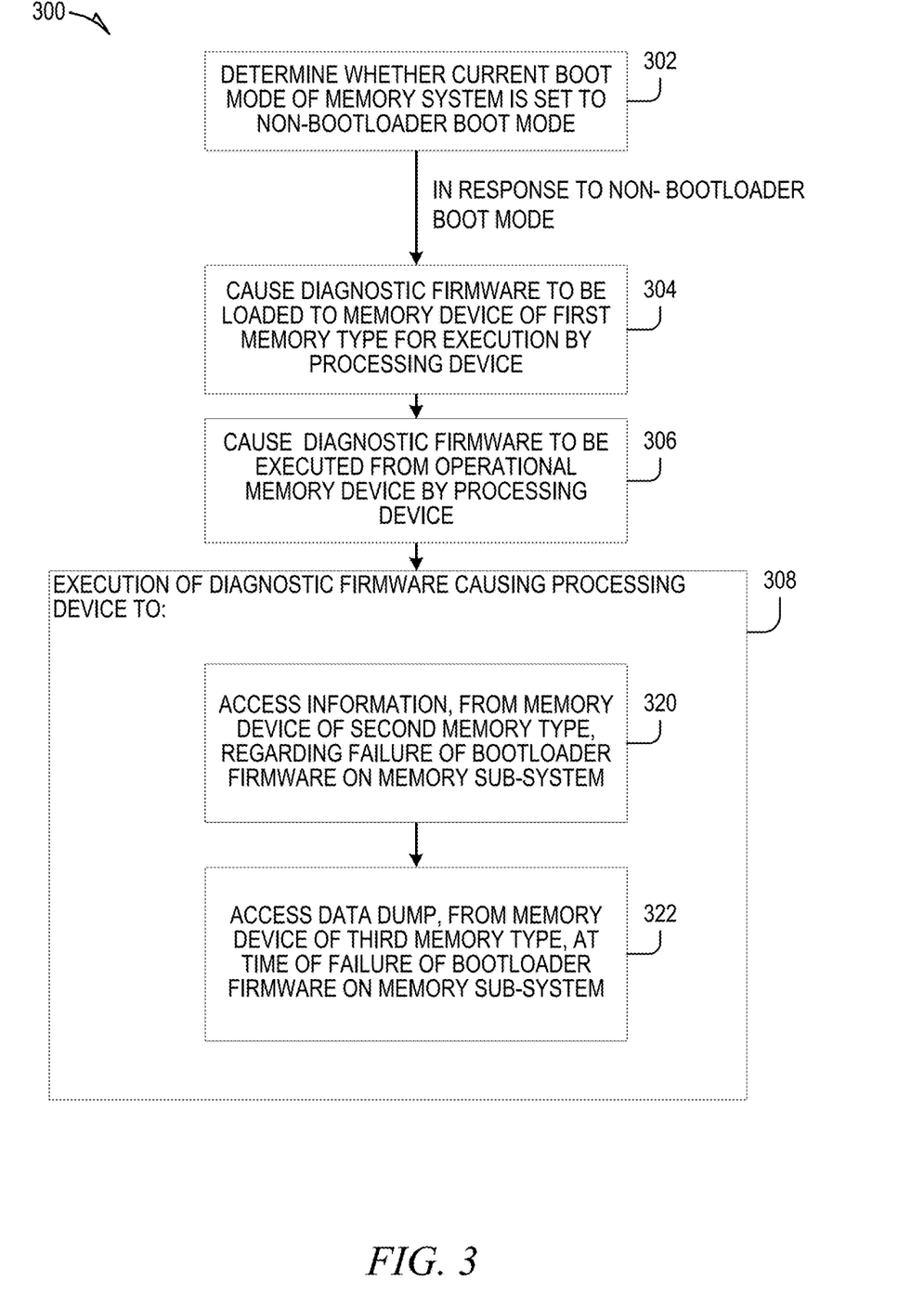

FIGS. 2 and 3 are flow diagrams of example methods for bootloader failure analysis of a memory system, in accordance with some embodiments of the present disclosure. The methods 200, 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, at least one of the methods 200, 300 is performed by the memory sub-system controller 115 of FIG. 1 based on the bootloader firmware 113. Additionally, or alternatively, for some embodiments, at least one of the methods 200, 300 is performed, at least in part, by the local media controller 135 of the memory device 130 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are used in every embodiment. Other process flows are possible.

Referring now to the method 200 of FIG. 2, the method 200 illustrates an example of storing information on a memory sub-system in association with a failure of bootloader firmware that executed on the memory system. For some embodiments, the method 200 is invoked upon, soon after, a memory system (e.g., memory sub-system 110) starting up (e.g., booting up). Additionally, for some embodiments, the method 200 is invoked in response to a current boot mode of the memory system being set to a bootloader boot mode that causes the memory system to load and execute bootloader firmware on the memory system. According to some embodiments, the bootloader boot mode enables normal operation and usage of the memory system.

At operation 202, a processing device (e.g., the processor 117 of the memory sub-system controller 115) determines whether a current boot mode of the memory system (e.g., the memory sub-system 110) is set to a bootloader boot mode. In response to the processing device (e.g., the processor 117) determining that the current boot mode of the memory system is set to the bootloader boot mode, at operation 204, the processing device (e.g., the processor 117) causes bootloader firmware (e.g., the bootloader firmware 113) to be loaded, from a first memory device (e.g., the memory device 140) of a set of memory devices of the memory system, to a second memory device (e.g., the local memory 119) for execution by the processing device. For various embodiments, the first memory device is a first memory type (e.g., ROM), and the second memory device is a second memory type (e.g., RAM).

Subsequently, at operation 206, the processing device (e.g., the processor 117) causes the bootloader firmware (e.g., the bootloader firmware 113) to be executed from the second memory device (e.g., the local memory 119) by the processing device, where the bootloader firmware is configured to cause the processing device (e.g., the processor 117) to store information regarding a failure of the bootloader firmware (e.g., the bootloader firmware 113) to be saved on a third memory device (e.g., memory device 150) of the set of memory devices in response to detection of the failure. For various embodiments, the third memory device is a third memory type. For instance, the third memory type can be an EEPROM, which does not need initialization by the memory system for data access.

At operation 208, during execution of the bootloader firmware (e.g., the bootloader firmware 113) by the processing device (e.g., the processor 117), the bootloader firmware causes the processing device to perform one or more operations, which can include operations 220, 222, 224. For operation 220, the bootloader firmware (e.g., the bootloader firmware 113) causes the processing device (e.g., the processor 117) to initialize a fourth memory device (e.g., the memory device 130) of the set of memory devices. For various embodiments, the fourth memory device is a fourth memory type, such as non-volatile memory (e.g., NAND-type memory). During operation 222, the bootloader firmware (e.g., the bootloader firmware 113) causes the processing device (e.g., the processor 117) to cause operational firmware to be loaded, from the fourth memory device (e.g., the memory device 130), to the second memory device (e.g., the local memory 119) for execution by the processing device (e.g., the processor 117). Thereafter, at operation 224, the bootloader firmware (e.g., the bootloader firmware 113) causes the processing device (e.g., the processor 117) to cause the operational firmware to be executed from the second memory device (e.g., the local memory 119) by the processing device (e.g., the processor 117).

For some embodiments, the bootloader firmware (e.g., the bootloader firmware 113) is configured to cause the processing device (e.g., the processor 117) to store a data dump (e.g., binary data dump) associated with the processing device to be saved on the fourth memory device (e.g., the memory device 130) in response to detection of the failure by the processing device. For some embodiments, the data dump comprises contextual data stored within the processing device (e.g., the processor 117) at a time of the failure of the bootloader firmware (e.g., the bootloader firmware 113) on the memory system.

Referring now to the method 300 of FIG. 3, the method 300 illustrates an example of accessing information, stored on a memory sub-system, in association with a failure of bootloader firmware that executed on the memory system. Similar to the method 200 of FIG. 2, the method 300 of FIG. 3 can be invoked upon, or soon after, a memory system (e.g., memory sub-system 110) starting up (e.g., booting up). Additionally, for some embodiments, the method 300 is invoked after a current boot mode of a memory system is set to a non-bootloader boot mode that causes the memory system to avoid loading and executing bootloader firmware on the memory system. For instance, the non-bootloader boot mode can include a boot mode that causes non-bootloader firmware on the memory system to be loaded and executed in place of bootloader firmware. The non-bootloader firmware can comprise diagnostic firmware (e.g., debug firmware) that enables one or more diagnostic functions (e.g., debug functions) to be performed on the memory system, such as a diagnostic function configured to access at least a portion of information stored on the memory system in association with a failure of bootloader firmware executed on the memory system. For various embodiments, the method 300 is invoked and performed sometime after the method 200 of FIG. 2 is performed.

At operation 302, a processing device (e.g., the processor 117 of the memory sub-system controller 115) determines whether a current boot mode of the memory system (e.g., the memory sub-system 110) is set to a non-bootloader boot mode, such as a boot mode that causes or otherwise enables another firmware (e.g., diagnostic firmware) to be loaded and executed on the memory system (e.g., in place of the bootloader firmware 113). In response to the processing device (e.g., the processor 117) determining that the current boot mode of the memory system is set to the non-bootloader boot mode, at operation 304, the processing device (e.g., the processor 117) causes diagnostic firmware to be loaded to a second memory device (e.g., the local memory 119) for execution by the processing device. For some embodiments, the second memory device is a second memory type, such as volatile memory (e.g., RAM) that can operate as operational memory. Depending on the embodiment, the diagnostic firmware can be loaded from a first memory device (e.g., the memory device 140) of the memory system (e.g., where the first memory device is a ROM device), or from an external data source, such as one operably coupled to the memory system by way of a hardware data communication interface (e.g., hardware serial data interface) of the memory system. According to some embodiments, the non-bootloader boot mode comprises a serial data connection boot mode (e.g., UART boot mode) that causes the diagnostic firmware to be loaded to the second memory device (e.g., the local memory 119) via a hardware serial data interface (e.g., UART protocol-based hardware interface) of the memory system (e.g., loaded from the hardware serial data interface to the second memory device after power for the memory system is cycled).

For some embodiments, the diagnostic firmware is configured to provide an interactive interface for executing a diagnostic function on the memory system. The diagnostic function can be configured to access the at least a portion of the information (regarding failure of the bootloader firmware) accessed from the third memory device (e.g., the memory device 150). Additionally, or alternatively, the diagnostic function can be configured to access the at least a portion of the data dump accessed from the fourth memory device (e.g., the memory device 130). Further, the interactive interface can be configured to execute the diagnostic function in response to a command received by the interactive interface from a host system (e.g., the host system 120) that is operatively coupled to the memory system. For various embodiments, the diagnostic firmware is digitally signed (e.g., by the manufacturer of the memory system), and a digital signature associated with the diagnostic firmware can be verified (e.g., validated or authenticated) prior to the processing device (e.g., the processor 117) executing the diagnostic firmware or prior to the diagnostic firmware being loaded to the second memory device (e.g., the local memory 119) for execution. Additionally, for some embodiments, the memory system is digitally unlocked (e.g., by the manufacturer) prior to the processing device (e.g., the processor 117) causing the diagnostic firmware to be loaded to the second memory device (e.g., the local memory 119) for execution. For instance, the unlocking of the memory system can unlock or otherwise enable a hardware data communication interface (e.g., UART protocol-based hardware interface) that facilitates loading of a non-bootloader firmware (e.g., diagnostic firmware) onto the memory system. In another instance, the unlocking of the memory system can unlock or otherwise enable access to (e.g., access to storage area of the EEPROM device and/or the NAND-type memory device storing) stored information regarding a failure of a bootloader firmware, a stored data dump associated with a failure of a bootloader firmware, or both by a non-bootloader firmware (e.g., diagnostic firmware).

After the diagnostic firmware is loaded to the second memory device (e.g., the local memory 119), at operation 306, the processing device (e.g., the processor 117) causes the diagnostic firmware to be executed from the second memory device (e.g., the local memory 119) by the processing device. At operation 308, during execution of the diagnostic firmware by the processing device (e.g., the processor 117), the diagnostic firmware causes the processing device to perform one or more operations, which can include operations 320, 322. For operation 320, the diagnostic firmware causes the processing device (e.g., the processor 117) to access (e.g., read), from the third memory device (e.g., the memory device 150), at least a portion of information regarding a failure of the bootloader firmware (e.g., the bootloader firmware 113). For various embodiments, the information is stored on the third memory device (e.g., the memory device 150) by the bootloader firmware (e.g., the bootloader firmware 113) during the bootloader firmware's execution (e.g., by operation 206 of the method 200 of FIG. 2). During operation 322, the diagnostic firmware causes the processing device (e.g., the processor 117) to access (e.g., read), from a fourth memory device (e.g., the memory device 130), at least a portion of a data dump of the memory system at a time of a failure of the bootloader firmware (e.g., the bootloader firmware 113), where the data dump can comprise contextual data of the processing device (e.g., the processor 117). For some embodiments, the diagnostic firmware causes the processing device (e.g., the processor 117) to initialize the fourth memory device (e.g., the memory device 130) of the set of memory devices prior to the diagnostic firmware causing the processing device to access the at least a portion of the data dump.

Figure 4:
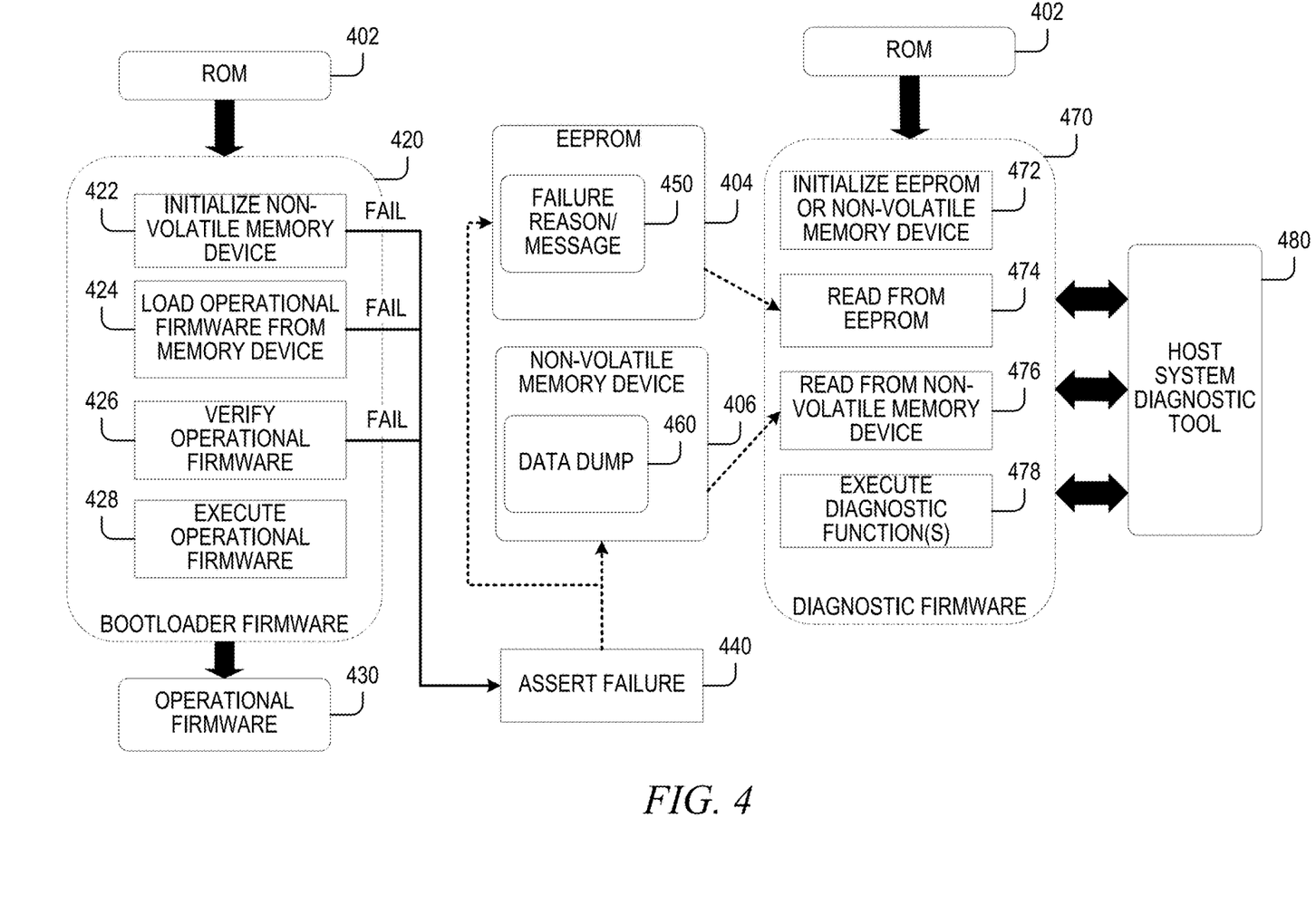
FIG. 4 is a diagram illustrating an example of operations and dataflow on a memory system, in accordance with some embodiments of the present disclosure.

FIG. 4 is a diagram illustrating an example of operations and dataflow on a memory system, in accordance with some embodiments of the present disclosure. According to some embodiments, the memory system of FIG. 4 is implemented by the memory sub-system 110 described herein with respect to FIG. 1. In FIG. 4, the memory system comprises a ROM device 402, an EEPROM device 404, and a non-volatile memory device 406 (e.g., NAND-type memory device). As shown, a bootloader firmware 420 is loaded from the ROM device 402 onto an operational memory device (e.g., such as a RAM device) of the memory system for execution by a processing device (e.g., the processor 117) of the memory system, and the bootloader firmware 420 is executed on the memory system. According to some embodiments, the memory system loads and executes the bootloader firmware 420 while a current boot mode of the memory system is set to a bootloader boot mode (e.g., normal or user boot mode). For some embodiments, the bootloader firmware 420 implements the bootloader firmware 113 described with respect to FIG. 1. During execution of the bootloader firmware 420, one or more of operations 422, 424, 426, 428 are performed by the processing device of the memory system. As illustrated, operation 422 attempts to initialize the non-volatile memory device 406. Operation 424 attempts to load operational firmware for the memory system from a memory device (e.g., the memory device initialized by operation 422) to the operational memory device of the memory system for execution. Operation 426 attempts to verify the operational firmware loaded to the operational memory device prior to the operational firmware being executed by the processing device of the memory system. Operation 428 attempts to execute the operational firmware by the processing device of the memory system (e.g., after the operational firmware has been successfully verified by operation 426). In FIG. 4, operational firmware 430 can represent the operational firmware after the operational firmware has been loaded to the operational memory device, verified, and started execution on the memory system.

During failure of one or more operations of the bootloader firmware 420 (e.g., failure of one or more of operations 422, 424, 426, 428), the memory system asserts a failure at operation 440, which results in a failure reason/message 450 (e.g., panic reason/message) for the asserted failure of the bootloader firmware 420 being saved to the EEPROM device 404, a data dump 460 (e.g., panic dump binary) of the memory system at a time of the asserted failure being saved to the non-volatile memory device 406, or both.

Subsequently, when a user (e.g., support or diagnostic engineer) wishes to diagnose (e.g., debug) the failure based on the failure reason/message 450 as stored, the data dump 460 as stored, or both, the user causes a diagnostic firmware 470 loaded from the ROM device 402 (or alternatively via a hardware data communication interface) onto the operational memory device of the memory system for execution by the processing device (e.g., the processor 117) of the memory system, and the diagnostic firmware 470 is executed on the memory system. According to some embodiments, the memory system loads and executes the diagnostic firmware 470 while a current boot mode of the memory system is set to a non-bootloader boot mode (e.g., a diagnostic boot mode). During execution of the diagnostic firmware 470, one or more of operations 472, 474, 476, 478 are performed by the processing device of the memory system. As illustrated, operation 472 attempts to initialize the EEPROM device 404 (e.g., to facilitate access the failure reason/message 450), the non-volatile memory device 406 (e.g., to facilitate access the data dump 460), or both. Operation 474 reads at least a portion of the failure reason/message 450 stored on the EEPROM device 404, and operation 476 reads at least a portion of the data dump 460 stored on the non-volatile memory device 406. Operation 478 executes one or more diagnostic functions (e.g., debug functions), where at least one of the diagnostic functions operates based on the at least a portion of the failure reason/message 450 read from the EEPROM device 404, the at least a portion of the data dump 460 read from the non-volatile memory device 406, or both. According to some embodiments, a host system diagnostic tool 480 is operating on a host system (e.g., the host system 120 of FIG. 1) operably coupled to the memory system The host system diagnostic tool 480 can be configured to issue one or more commands or otherwise interact with the diagnostic firmware 470 executing on the memory system, which can enable the host system diagnostic tool 480 to directly or indirectly access the failure reason/message 450 stored on the EEPROM device 404 or stored on the non-volatile memory device 406. Additionally, the one or more commands or interactions from the host system diagnostic tool 480 can result in one or more diagnostic functions being executed on the memory system by operation 478.

Figure 5:
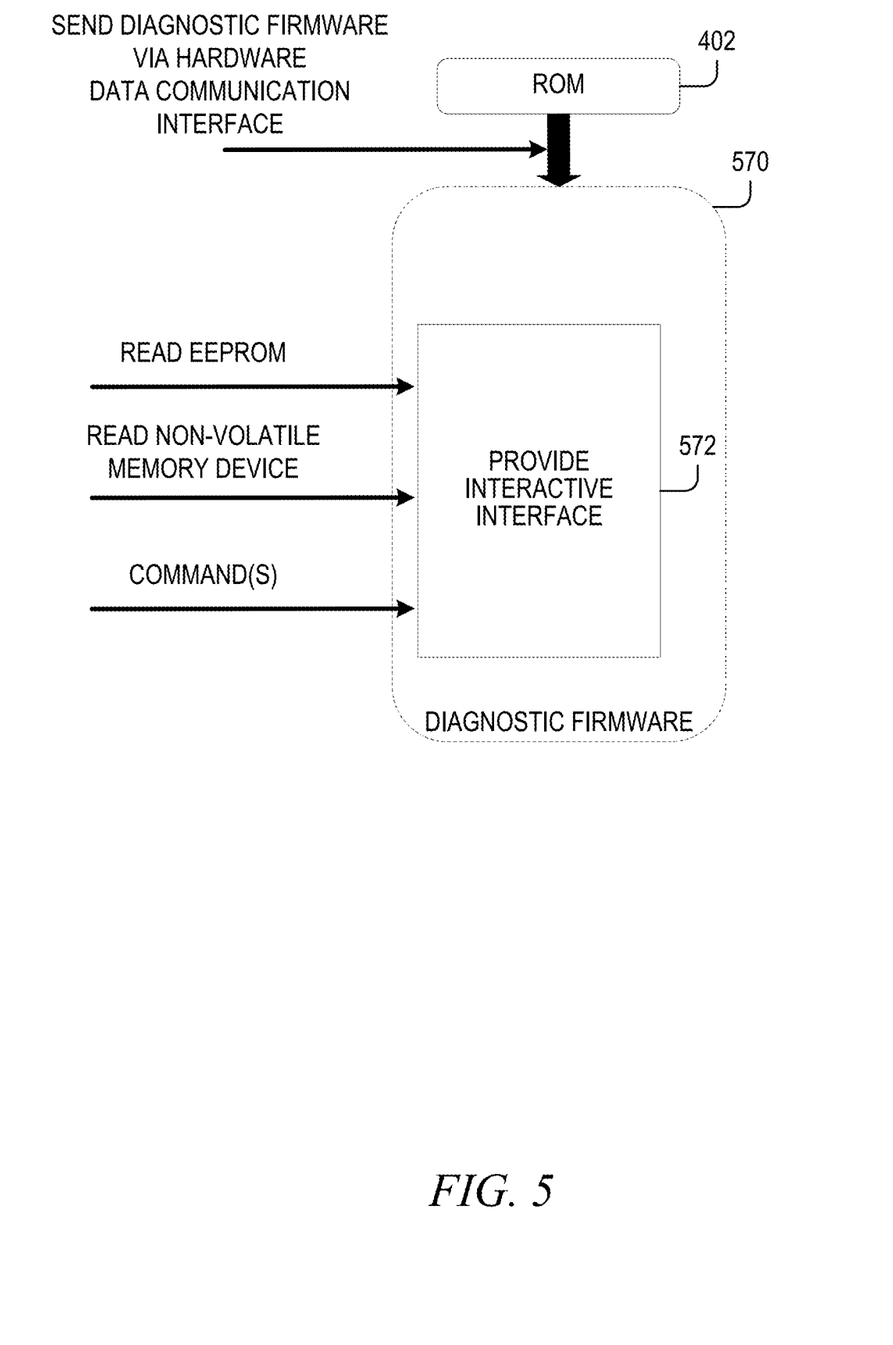
FIG. 5 is a diagram illustrating an example of operations and dataflow on a memory system during execution of a diagnostic firmware, in accordance with some embodiments of the present disclosure.

FIG. 5 is a diagram illustrating an example of operations and dataflow on a memory system during execution of a diagnostic firmware, in accordance with some embodiments of the present disclosure. In particular, after the memory system is set to a hardware data communication boot mode (e.g., UART boot mode), a user can cause a diagnostic firmware 570 to be sent to the memory system via a hardware data communication interface (e.g., UART protocol-based hardware interface), which can cause the memory system to load and execute the diagnostic firmware 570 on the memory system. As the diagnostic firmware 570 is executing on the memory system, the diagnostic firmware 570 can provide an interactive interface by operation 572. Through the provided interactive interface, a user can read data (e.g., the failure reason/message 450 of FIG. 4) from an EEPROM device (e.g., the EEPROM device 404 of FIG. 4), can read data (e.g., the data dump 460 of FIG. 4) from a non-volatile memory device (e.g., the non-volatile memory device 406 of FIG. 4), or can issue one or more commands (e.g., to perform one or more diagnostic functions on the memory system using the data read by the diagnostic firmware 570). For some embodiments, the interactive interface provided by the diagnostic firmware 570 can be accessed by a user via a diagnostic software tool operating on a host system (e.g., the host system 120 of FIG. 1) that is operably coupled to the memory system.

Figure 6:
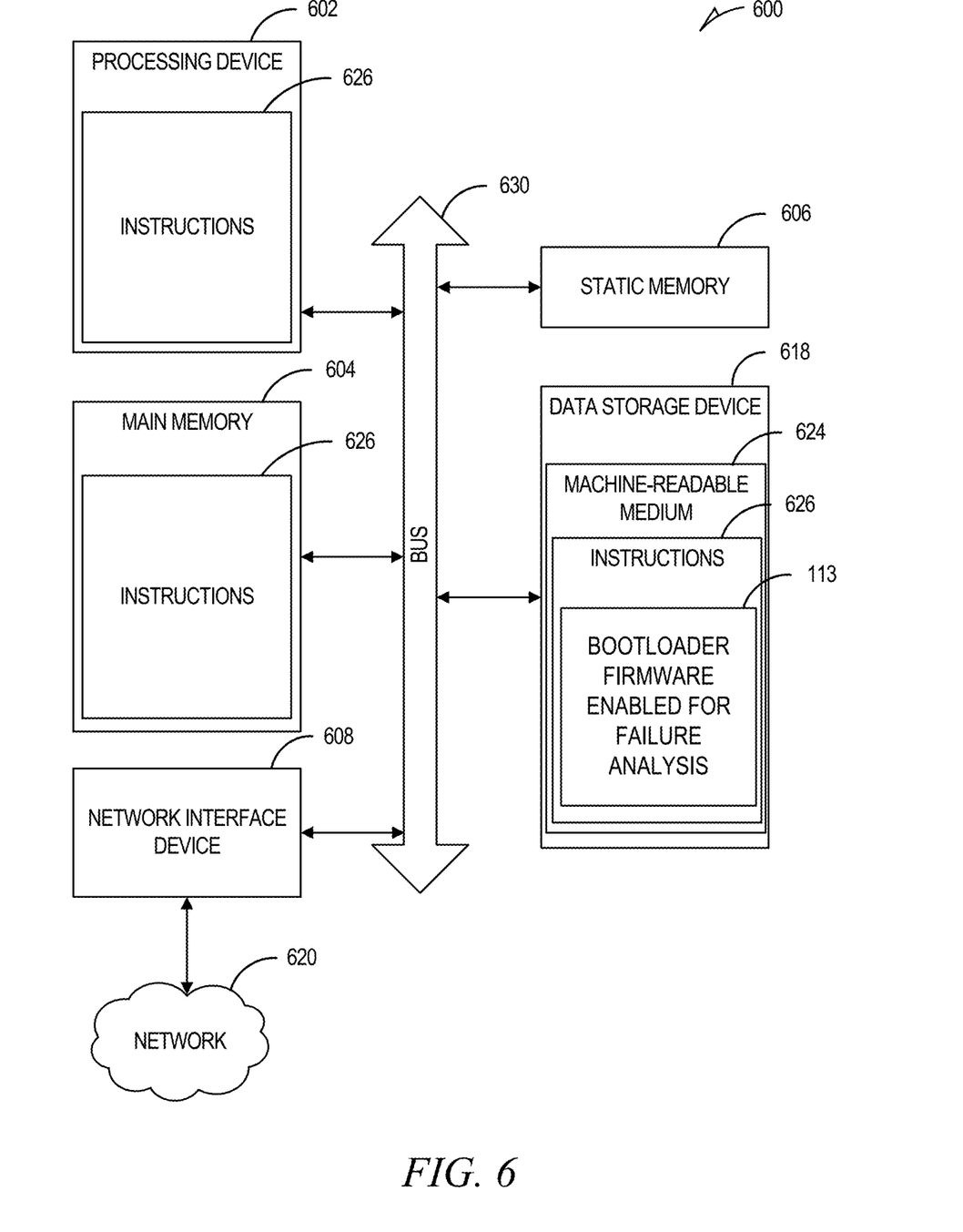
FIG. 6 is a block diagram of an example computer system in which embodiments of the present disclosure may operate.

FIG. 6 illustrates an example machine in the form of a computer system 600 within which a set of instructions can be executed for causing the machine to perform any one or more of the methodologies discussed herein. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations described herein. In alternative embodiments, the machine can be connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage device 618, which communicate with each other via a bus 630.

The processing device 602 represents one or more general-purpose processing devices such as a microprocessor, a central processing unit, or the like. More particularly, the processing device 602 can be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), a network processor, or the like. The processing device 602 is configured to execute instructions 626 for performing the operations and steps discussed herein. The computer system 600 can further include a network interface device 608 to communicate over a network 620.

The data storage device 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage device 618, and/or main memory 604 can correspond to the memory sub-system 110 of FIG. 1.

In one embodiment, the instructions 626 include instructions to implement bootloader failure analysis of a memory system as described herein (e.g., the bootloader firmware 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A memory system comprising:
    a set of memory devices; and
    a processing device, operably coupled to the set of memory devices, configured to perform operations comprising:
        causing bootloader firmware to be loaded from a first memory device of the set of memory devices to a second memory device for execution by the processing device, the first memory device being a first memory type, the second memory device being a second memory type; and
        causing the bootloader firmware to be executed from the second memory device by the processing device, the bootloader firmware being configured to cause the processing device to store information regarding a failure of the bootloader firmware to be saved on a third memory device of the set of memory devices in response to detection of the failure, the third memory device being a third memory type, execution of the bootloader firmware causing the processing device to:
            initialize a fourth memory device of the set of memory devices, the fourth memory device being a fourth memory type;
            cause operational firmware to be loaded from the fourth memory device to the second memory device for execution by the processing device; and
            cause the operational firmware to be executed from the second memory device by the processing device.

2. The memory system of claim 1, wherein the first memory device is a read only memory (ROM) device.

3. The memory system of claim 1, wherein the second memory device is a random-access memory (RAM) device.

4. The memory system of claim 1, wherein the third memory device is an electrically erasable programmable read-only memory (EEPROM) device.

5. The memory system of claim 1, wherein the fourth memory device is a negative-and (NAND)-type memory device.

6. The memory system of claim 1, wherein the information comprises information describing a type of failure.

7. The memory system of claim 1, wherein the information comprises information regarding a failure message.

8. The memory system of claim 1, wherein the bootloader firmware is configured to cause the processing device to store a data dump associated with the processing device to be saved on the fourth memory device in response to detection of the failure, the data dump comprising contextual data stored within the processing device at a time of the failure of the bootloader firmware on the memory system.

9. The memory system of claim 8, wherein the operations comprise:
    after the bootloader firmware is executed and the data dump is stored on the fourth memory device:
        causing diagnostic firmware to be loaded to the second memory device for execution by the processing device; and
        causing the diagnostic firmware to be executed from the second memory device by the processing device, execution of the diagnostic firmware causing the processing device to access at least a portion of the data dump from the fourth memory device.

10. The memory system of claim 9, wherein the diagnostic firmware is configured to provide an interactive interface for executing a diagnostic function on the memory system, the diagnostic function being configured to access the at least a portion of the data dump accessed from the fourth memory device, the interactive interface being configured to execute the diagnostic function in response to a command received by the interactive interface from a host system operatively coupled to the memory system.

11. The memory system of claim 9, wherein the operations comprise:
    causing a current boot mode of the memory system to change to a non-bootloader boot mode that enables the diagnostic firmware to be loaded to the second memory device after power for the memory system is cycled.

12. The memory system of claim 9, wherein the diagnostic firmware is loaded to the second memory device via a hardware serial data interface of the memory system.

13. The memory system of claim 12, wherein the operations comprise:
    causing a current boot mode of the memory system to change to a serial data connection boot mode that causes the diagnostic firmware to be loaded to the second memory device via the hardware serial data interface after power for the memory system is cycled.

14. The memory system of claim 1, wherein the operations comprise:
    after the bootloader firmware is executed and the information is stored on the third memory device:
        causing diagnostic firmware to be loaded to the second memory device for execution by the processing device; and
        causing the diagnostic firmware to be executed from the second memory device by the processing device, execution of the diagnostic firmware causing the processing device to access at least a portion of the information from the third memory device.

15. The memory system of claim 14, wherein the diagnostic firmware is configured to provide an interactive interface for executing a diagnostic function on the memory system, the diagnostic function being configured to access the at least a portion of the information accessed from the third memory device, the interactive interface being configured to execute the diagnostic function in response to a command received by the interactive interface from a host system operatively coupled to the memory system.

16. The memory system of claim 14, wherein the operations comprise:
causing a current boot mode of the memory system to change to a diagnostic boot mode, the causing of the diagnostic firmware to be loaded to the second memory device occurring after power for the memory system is cycled.

17. The memory system of claim 14, wherein the diagnostic firmware is loaded to the second memory device via a hardware serial data interface of the memory system.

18. The memory system of claim 17, wherein the operations comprise:
causing a current boot mode of the memory system to change to a serial data connection boot mode, the causing of the diagnostic firmware to be loaded to the second memory device via the hardware serial interface occurring after power for the memory system is cycled.

19. A method comprising:
causing, by a processing device of a memory system, bootloader firmware to be loaded from a first memory device of the memory system to a second memory device of the memory system for execution by the processing device, the first memory device being a first memory type, the second memory device being a second memory type; and
causing, by the processing device, the bootloader firmware to be executed from the second memory device by the processing device, the bootloader firmware being configured to cause the processing device to store information regarding a failure of the bootloader firmware to be saved on a third memory device of the memory system in response to detection of the failure, the third memory device being a third memory type, execution of the bootloader firmware causing the processing device to:
initialize a fourth memory device of the memory system, the fourth memory device being a fourth memory type;
cause operational firmware to be loaded, from the fourth memory device to the second memory device for execution by the processing device; and
cause the operational firmware to be executed from the second memory device by the processing device.

20. At least one non-transitory machine-readable storage medium comprising instructions that, when executed by a processing device of a memory system, cause the processing device to perform operations comprising:
after power for the memory system is initially applied or cycled, determining whether a current boot mode of the memory system is set to a diagnostic boot mode; and
in response to determining that the current boot mode is set to the diagnostic boot mode:
causing diagnostic firmware to be loaded to a random-access memory (RAM) device of the memory system; and
causing the diagnostic firmware to be executed from the random-access memory device by the processing device, execution of the diagnostic firmware causing the processing device to access at least one of:
information, from an electrically erasable programmable read-only memory (EEPROM) device, regarding a failure of bootloader firmware on the memory system; or
data dump, from a negative-and (NAND)-type memory device of the memory system, contextual data stored within the processing device at a time of the failure of the bootloader firmware on the memory system.

* * * * *